United States Patent
Li et al.

(10) Patent No.: US 9,802,796 B2
(45) Date of Patent: Oct. 31, 2017

(54) CONNECTOR AND COMBINATION CRANE AND CONNECTING METHOD USING THE SAME

(71) Applicant: Terex Cranes Germany GmbH, Zweibrücken (DE)

(72) Inventors: Junjie Li, ShanDong (CN); Günter Karp, Wilmington, NC (US)

(73) Assignee: TEREX GLOBAL GMBH, Schaffhausen (CH)

( * ) Notice: Subject to any disclaimer, the term of this patent is extended or adjusted under 35 U.S.C. 154(b) by 100 days.

(21) Appl. No.: 14/624,659

(22) Filed: Feb. 18, 2015

(65) Prior Publication Data

US 2015/0232305 A1    Aug. 20, 2015

(30) Foreign Application Priority Data

Feb. 17, 2014 (EP) .................................. 14155399

(51) Int. Cl.
| | |
|---|---|
| *B66C 23/18* | (2006.01) |
| *F16C 11/04* | (2006.01) |
| *B66C 23/62* | (2006.01) |
| *B66C 23/36* | (2006.01) |

(52) U.S. Cl.
CPC .............. *B66C 23/62* (2013.01); *B66C 23/18* (2013.01); *B66C 23/36* (2013.01); *F16C 11/04* (2013.01); *Y10T 403/32606* (2015.01)

(58) Field of Classification Search
CPC ......... B66C 23/00; B66C 23/06; B66C 23/18; B66C 23/26; B66C 23/36; B66C 23/365; B66C 23/62; B66C 23/64; B66C 23/66; B66C 13/00; B66C 13/04; Y10T 403/32861; Y10T 403/32868; Y10T 403/32877; Y10T 403/32885; Y10T 403/32893; Y10T 403/32901; Y10T 403/32909; Y10T 403/32918
USPC .................................................. 403/150–157
See application file for complete search history.

(56) References Cited

U.S. PATENT DOCUMENTS

| | | |
|---|---|---|
| 751,205 A | 2/1904 | Raymond |
| 2,283,049 A | 5/1942 | Cormier, Jr. |
| 3,140,857 A | 7/1964 | Nickles |
| | (Continued) | |

FOREIGN PATENT DOCUMENTS

| | | |
|---|---|---|
| CN | 1899949 A | 1/2007 |
| CN | 102398863 A | 4/2012 |
| | (Continued) | |

*Primary Examiner* — Sang Kim
*Assistant Examiner* — Juan Campos, Jr.
(74) *Attorney, Agent, or Firm* — Browdy and Neimark, PLLC

(57) ABSTRACT

A connector is provided for connecting a first crane and a second crane, each crane having a boom, the connector includes a first connecting arm and a second connecting arm, the first connecting arm building the top of the boom of the first crane, the second connecting arm building the top of the boom of the second crane, the first connecting arm and the second connecting arm being hinged together about only one common pivotal axis within a common pivotal plane, and the booms of the first and the second cranes are linked up in motion in a common luffing plane, and the luffing plane is identical to the pivotal plane.

12 Claims, 7 Drawing Sheets

(56) References Cited

U.S. PATENT DOCUMENTS

| | | | | |
|---|---|---|---|---|
| 5,836,463 | A | * 11/1998 | Khachaturian | B66C 19/02 212/270 |
| 6,601,717 | B1 | * 8/2003 | Khachaturian | B66C 19/02 212/270 |
| 7,066,343 | B1 | * 6/2006 | Khachaturian | B66C 19/02 212/270 |
| 7,789,253 | B2 | 9/2010 | Sawai et al. | |
| 9,527,554 | B2 | * 12/2016 | Lee | B63B 27/30 |
| 2014/0300112 | A1 | * 10/2014 | Lee | E02D 31/002 290/55 |

FOREIGN PATENT DOCUMENTS

| | | |
|---|---|---|
| DE | 914283 C | 6/1954 |
| DE | 1531275 A1 | 12/1969 |
| DE | 4241018 A1 | 6/1994 |
| DE | 202006002023 U1 | 6/2007 |
| EP | 0650920 A1 | 5/1995 |
| GB | 1162405 A | 8/1969 |
| JP | 04251096 A | 9/1992 |
| JP | 06211483 A | 8/1994 |
| SU | 800113 A1 | 1/1981 |
| WO | 2013004096 A1 | 1/2013 |

* cited by examiner

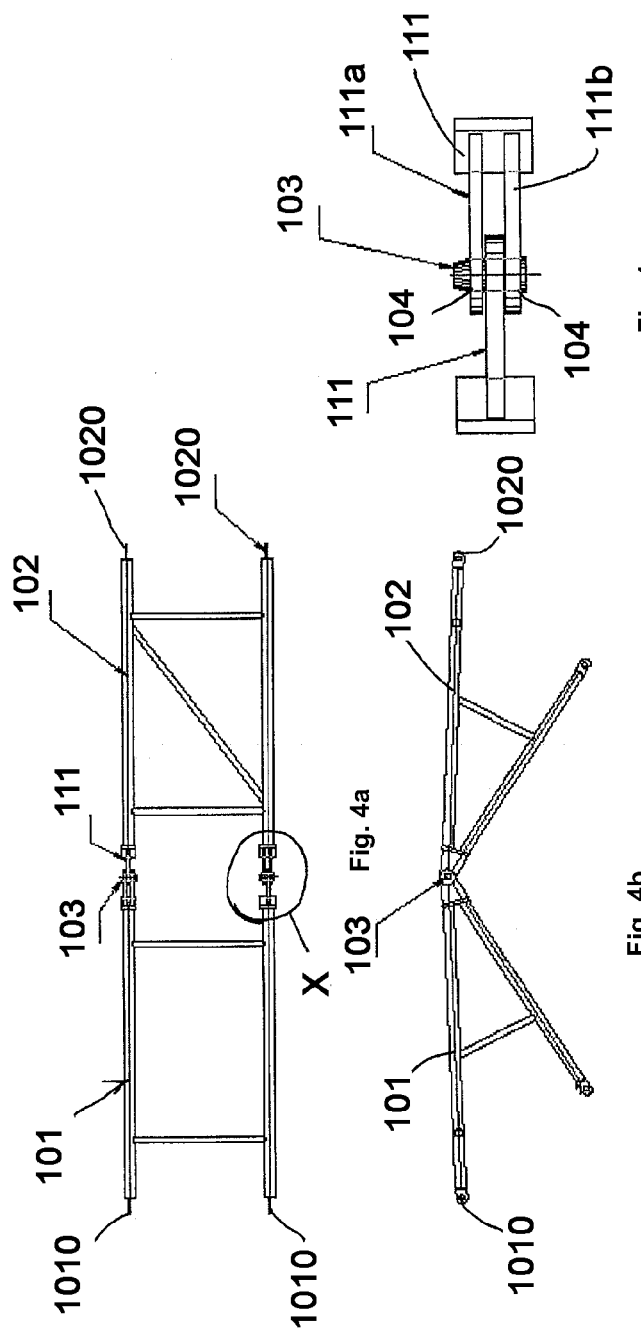

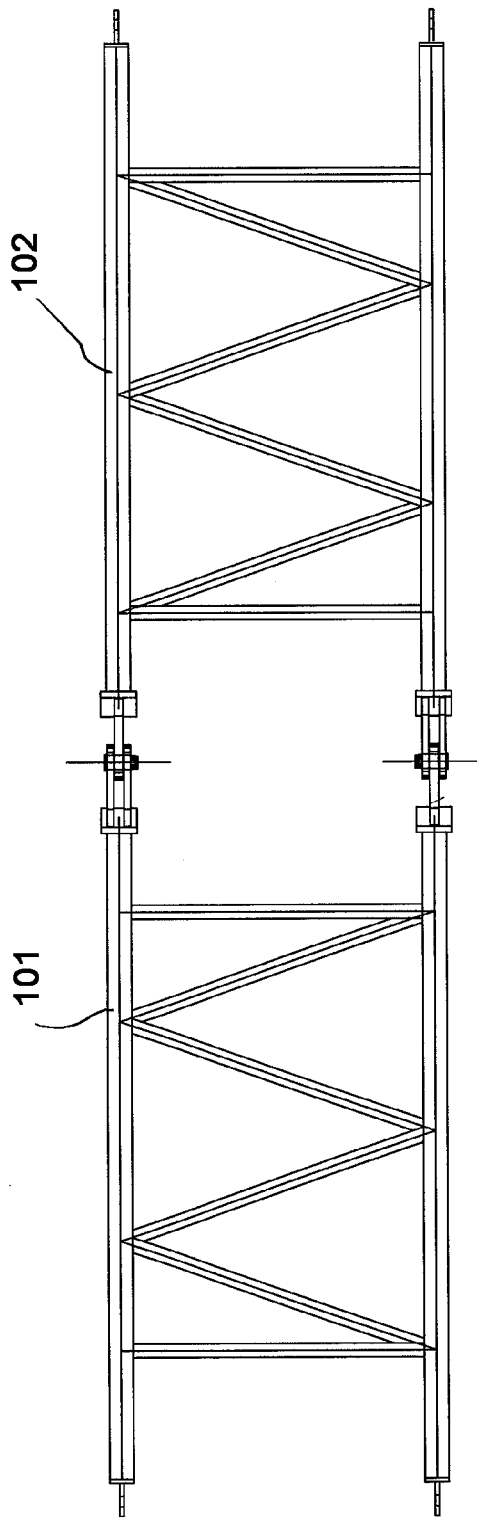
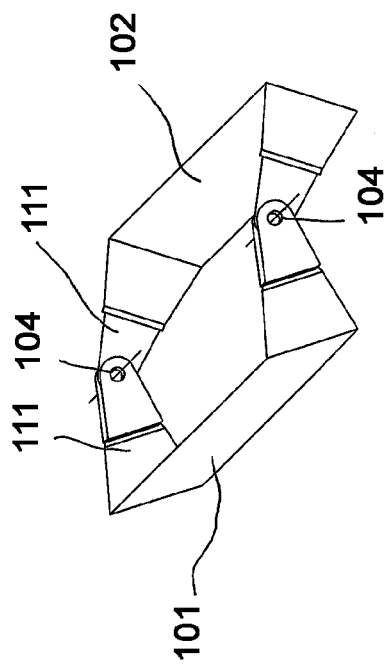
Fig. 5a
Fig. 5b

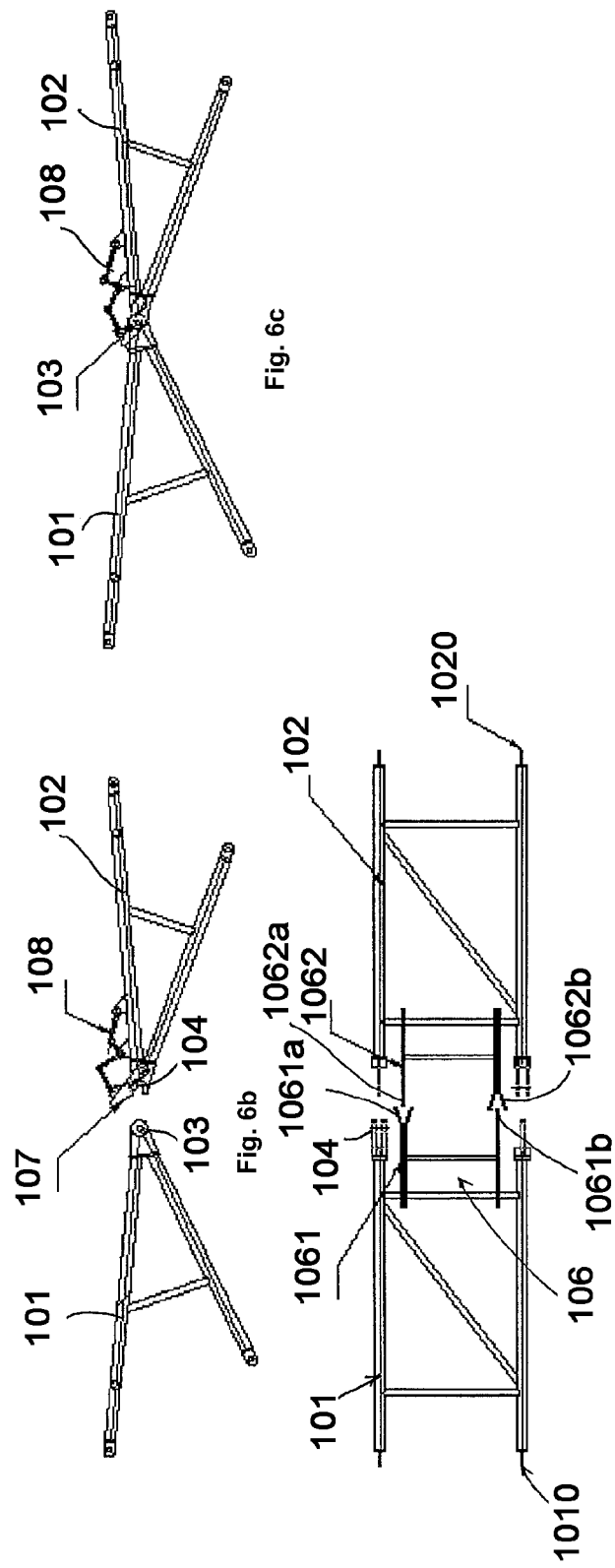

CONNECTOR AND COMBINATION CRANE AND CONNECTING METHOD USING THE SAME

CROSS-REFERENCES TO RELATED APPLICATIONS

This application claims the priority of European Patent Application, Serial No. 14 155 399.0, filed Feb. 17, 2014, pursuant to 35 U.S.C. 119(a)(d), the content of which is incorporated herein by reference in its entirety as if fully set forth herein.

FIELD OF THE INVENTION

The present invention relates to technical field of lifting equipment and more specifically to a connector for connecting two basic cranes having booms and a combination crane having such a connector.

BACKGROUND OF THE INVENTION

For a crane, each of its components for bearing load must have certain safety tolerance to ensure safety of apparatus, operators and properties. Therefore, once a weight to be lifted exceeds the lifting capacity of a crane, it is not allowed to lift such a weight by using such a crane. One option is to simply choose to use a crane of a larger size. However, economically speaking, the cost will be increased considerably if a larger crane is purchased for accomplishing the task of lifting, and furthermore the requirement for the floor supporting the crane will become higher if the tonnage of the larger crane exceeds a certain value, which means very high cost for the treatment of the floor will be involved. In order to solve this problem in an economical way, a method of combine lifting by using a plurality of cranes had been proposed already.

The first way of combined lifting is to carry out the lifting when the plurality of cranes are not connected to each other: 1) the lifting hooks of the cranes are attached directly to the same weight (as shown in FIG. 1b) but the load born by each crane is undefined. 2) the plurality of cranes lift the same weight together by a balance beam (as shown in FIG. 1a), such as the lifting equipment described in patent document US7789253B2. For this technical solution, the load on each crane is defined. In both cases mentioned above, anti-tipping ability and structural stability of each crane is not improved compared. Thus during the lifting operation their balance state is vulnerable to be destroyed.

The second way of combined lifting is to use one crane having two booms to lift an object, for instance, the lifting equipment illustrated in patent document CN1899949A. For example, the two parallel booms are connected by a horizontal connecting component, e.g. TEREX-DEMAG CC8800-1 Twin, or the two booms are connected to form an A-shaped united boom, e.g. Sarens SGC-120 ring-rail crane.

The third way of combined lift is to connect two cranes at their respective top of the booms by a short balance beam, e.g. the lifting equipment described in patent document GB19670039354.

The above three ways of combined lifting are considered to have following limitations: 1) compared with the basic crane, the combination crane does not allow to reduce axial load of the boom of a single basic crane and also to enhance anti-tipping ability and structural stability of the basic cranes; 2) the structure is relatively complex; 3) the existing basic crane itself has to be modified greatly to meet the requirement of combined lifting, thereby resulting in relatively high investment.

Therefore the present invention is to seek for a lifting equipment capable of overcoming one or more of the above problems of the prior art.

SUMMARY OF THE INVENTION

The objective of the present invention is to enhance lifting capability of each basic crane and improve anti-tipping capability and structural stability thereof and decrease axial compression force borne by the boom thereof, with the structure of the existing basic cranes changing as small as possible or even without any changes in the structure of the existing cranes.

The above objective of the invention is achieved by a connector comprising following technical features. A connector for connecting a first crane and a second crane, each crane having a boom, said connector comprising a first connecting arm and a second connecting arm, the first connecting arm building the top of the boom of the first crane, the second connecting arm building the top of the boom of the second crane, the first connecting arm and the second connecting arm being hinged together about only one common pivotal axis within a common pivotal plane, and wherein the booms of the first and the second cranes are linked up in motion in a common luffing plane, wherein the luffing plane is identical to the pivotal plane. In particular, the first connecting arm builds the top of the boom of the first crane such that the first connecting arm is at least a part of the boom of the first crane. Alternatively, the first connecting arm can also be configured to be fixedly connected to the top of the boom of the first crane as an extension thereof. Also the second connecting arm builds the top of the boom of the second crane either by being at least a part of the boom of the second crane or by being configured to be fixedly connected to the top of the boom of the second crane as an extension thereof. The first connecting arm and the second connecting arm are preferably directly hinged together. In particular, the common pivotal axis is oriented horizontally. Thus, the common pivotal plane is oriented vertically. In particular, the first crane and the second crane are arranged such that a middle axis of the boom of the first crane and a middle axis of the boom of the second crane are arranged within the common luffing plane. In particular, the longitudinal axis intersect within the luffing plane.

Preferably, the horizontal pivotal axis is positioned within end region(s) of the first connecting arm and/or the second connecting arm. With this configuration, it enables the hinged first connecting arm and the second connecting arm to have a larger pivotal angle, and thus it is applicable to joint lifting operation of two basic cranes having booms of greatly different lengths. Said end region of the first connecting arm and/or of the second connecting arm is arranged opposite to a connecting region of the first connecting arm and/or the second connecting arm. With the connecting region the first connecting arm and/or the second connecting arm is preferably connected to the boom of the first crane and/or the boom of the second crane. In particular, the pivotal axis is positioned at the tip of the boom of each crane.

Preferably, the hinged connection between the first and second connecting arms is achieved by apertures in the first and second connecting arms and a pin inserted into the apertures. For such a hinged structure, it is simple, easy to manufacture and convenient to assemble.

In a preferred embodiment, the apertures are provided in connecting lugs of the first connecting arm or the second connecting arm, the connecting lugs being in a single-sheet form or in a fork-like form having at least two branch lugs extending parallel, for example, a double-branch form or three-branch form and so on.

Preferably, a connecting lug on the first connecting arm is in a single-sheet form and a matching connecting lug on the second connecting arm is in a fork-like form, preferably in double-branch form.

Preferably, the connecting lug in a single-sheet form on the first connecting arm is inserted between two branch lugs of the matching connecting lug in a fork form on the second connecting arm. Thus the branch lugs actually play the role of restraining the matching lug from moving along the horizontal pivotal axis so that in the hinged connection only one degree of freedom is maintained in movement.

Preferably, when viewed in cross-section, the apertures in the first connecting arm have closed circumferences and the apertures in the second connecting arm have non-closed circumferences and are configured to form a snap connection with the pin passing through the apertures in the first connecting arm. For this hinged connection structure, it is simple and easy to assemble and can avoid a complex operation process for aligning the apertures, and also avoid the operations of lifting and lowering booms of the cranes.

Preferably, the second connecting arm is provided with a lock hook which is configured to move between a lock position where the lock hook is engaged with the pin and an unlock position where the lock hook is disengaged with the pin. The lock hook is arranged to ensure firmer hinged connection, thereby avoiding disconnection of the hinged connection that may be caused by shake of the booms of the cranes during lifting operation.

Preferably, the connector comprises a guide mechanism configured to guide the first and second connecting arms to move so as to position the first and second connecting arms at a predetermined position during assembling the connector. Therefore, the aligning process is simplified and the assembling efficiency is enhanced.

Preferably, the connector includes a lock/unlock mechanism which is configured to secure or disconnect the hinged connection between the first and second connecting arms. The hinged connection formed by the connector is made more reliable by the lock/unlock mechanism to prevent slipping or sliding accidents from happening during lifting operation of the crane. In addition, when it is required to dissemble the combination crane and resume the basic cranes to their original forms, it is possible to use the lock/unlock mechanism to safely disconnect the hinged connection.

Preferably, the lock/unlock mechanism includes at least one extendable executing element, e.g. a hydraulic cylinder. It is possible to secure the hinged connection with reasonable strain through automatic control on the extendable executing element by the control system.

According to another aspect of the invention, a combination crane is provided, comprising a connector and two basic cranes having booms and connected by the connector.

Preferably, the basic cranes are crawled cranes.

Preferably, the booms of the basic cranes have equal or unequal lengths.

Preferably, the combination crane comprises a hoisting pulley block linked to the horizontal pivotal axis of the connector or on the top end of the boom of one of the two basic cranes, the hoisting pulley block being located inside the angle defined by the booms of the two basic cranes.

Preferably, the combination crane comprises a pair of hoisting pulley blocks, each of which is arranged on the top end of the boom of corresponding basic crane respectively, the pair of hoisting pulley cranes being located inside the angle defined by the booms of the two basic arms.

Preferably, the basic crane has a slewing support mechanism for enabling the boom to make slewing movements about the slewing center of the basic crane. With this configuration, during the lifting operation of the combination crane, the traveling direction of the basic crane can be regulated by the slewing support mechanism, namely to travel towards or backwards or make a turn, such that the spatial position of the weight can be changed freely.

Preferably, the combination crane comprises a control system for monitoring the force in the pendant bars of the basic cranes. Through such a control system, it is possible to avoid slipping or sliding of the combination crane and guarantee safe operation of the combination crane.

According to another aspect of the invention, a method for connecting the two basic cranes having booms with the connector is provided, comprising steps of:
a) maneuvering the booms of the two basic cranes such that they face each other within the same luffing plane;
b) positioning the first and second connecting arms relative to each other at predetermined positions;
c) hinging the first and second connecting arms together, orienting a pivotal axis of the hinged connection horizontally.

Preferably, the step b) comprises, prior to the positioning, fixedly connecting a free end of the first connecting arm of the connector to a top end of a boom of one of the two basic cranes and fixedly connecting a free end of the second connecting arm of the connector to a top end of a loom of the other of the two basic cranes. Such a step is compulsory when the first connecting arm and the second connecting arm are separate components from the booms of the cranes. In such a case, the connection between the booms of the two basic cranes can be carried out without greatly changing the existing booms of the basic cranes.

Preferably, the step b) includes monitoring the guide mechanism provided on the connector by a control system to achieve relative positioning of the first and second connecting arms.

Preferably, the method comprises, upon forming the hinged connection, controlling a lock/unlock mechanism provided on the connector by means of a control system to selectively secure or disconnect the hinged connection.

As to the combination crane formed by connecting two basic cranes with the connector of the invention, its rated load lifting capacity during operation is greater than the sum of the capacities of the two basic cranes. For example, when two basic cranes operate separately, each basic crane can lift a weight of 100 tons; while a combination crane formed by connecting the two cranes with the connector of the invention can lift a weight of more than 200 tons. In order to achieve the combine lifting by two basic cranes, the modifications necessary to be made to the original basic cranes may only comprise the addition of the connector and corresponding adjustments in electrical and control systems.

Preferably, the two basic cranes of the combination cranes are connected with a substantially horizontal connector as a connection piece. In particular, the connector is horizontally oriented. Such horizontal connection of the two basic cranes leads to a reduction of horizontal forces between the ground and each of the corners which are arranged on the ground.

Preferably, the substantially horizontal connector is tied to the lower propelling body, in particular to a crawler of at least one of the basic cranes. Alternatively, the substantially horizontal connector can be tied to the upper slewing body of at least one of the basic cranes. In particular, it is possible that the substantially horizontal connector is tied to the lower propelling body of the one basic crane and is tied to the upper slewing body of the other basic crane. In such case, the connector is inclined relative to the horizontal. However, such inclination is understood as being substantially horizontal. It is also possible that the substantially horizontal connector is tied to the boom of at least one of the basic cranes. Preferably, the length of the substantially horizontal connector can be variably adjusted. Such length adjustment can be provided by a winch, system of pulleys, pneumatic cylinders, hydraulic cylinders or a combination thereof.

The following drawings are provided to sufficiently disclose the present invention and allow those skilled in the art to carry out the invention according to disclosure of the description, and the embodiments of the invention are illustrated in detail with reference to the drawings. The drawings and corresponding embodiments are only intended to illustrate rather than to limit the present invention.

BRIEF DESCRIPTION OF THE DRAWINGS

FIGS. 4a-4c show a schematic view of the first embodiment of the connector according to the present invention, wherein FIG. 4a is a top view of the connector according to the present invention; FIG. 4b is a side view of the connector of the invention when viewed along a horizontal pivotal axis and FIG. 4c is an enlarged view of the part X of FIG. 4a;

FIGS. 5a-5b show a configuration of the connecting lugs on the first and second connecting arms of the connector according to the invention;

FIGS. 6a-6c show a schematic view of the second embodiment of the connector according to the present invention, wherein FIG. 6a is a top view of the connector of the invention in a positioning/aligning state before being assembled, and FIGS. 6b and 6c are side views of the connector of the invention in an un-assembled state and an assembled state, when viewed along a horizontal pivotal axis;

DESCRIPTION OF THE PREFERRED EMBODIMENTS

Figure 1A:
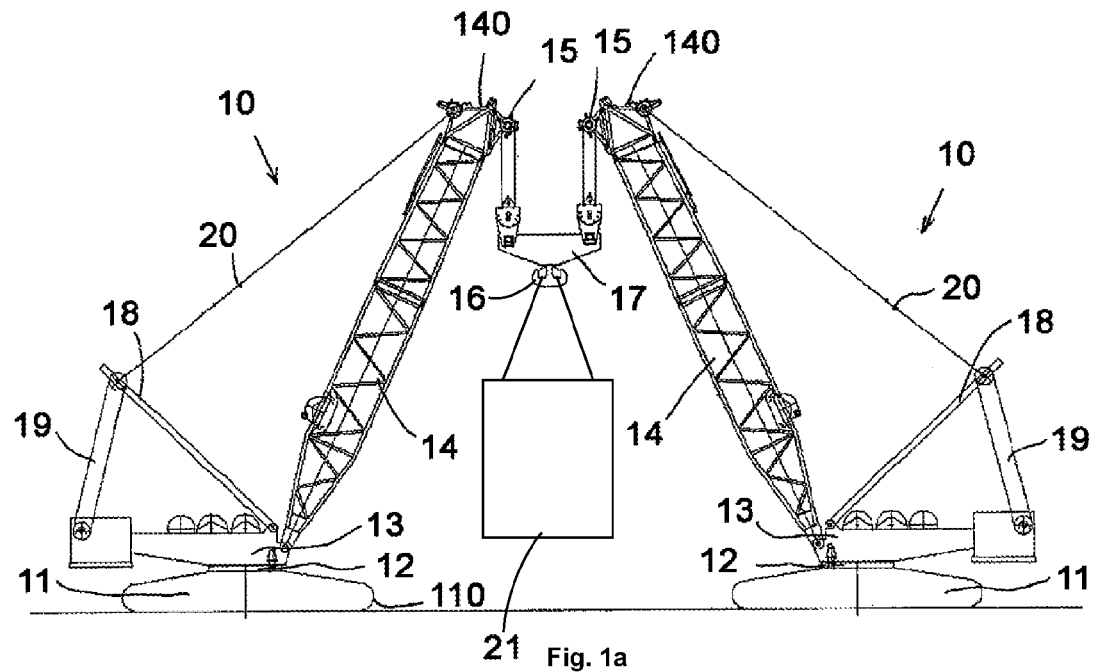
FIGS. 1a and 1b show how two crawled cranes operate cooperatively to lift the same object according to prior art.

The embodiments of the invention will be described in detail with reference to the drawings. The same reference numbers are used to indicate the same or similar components in the drawings if possible.

A crawler crane having a boom is taken as an example in the present application for illustration. It is easy for those skilled in the art to envisage that the present invention is also applicable to cranes of other types as long as they have booms.

Figure 1B:
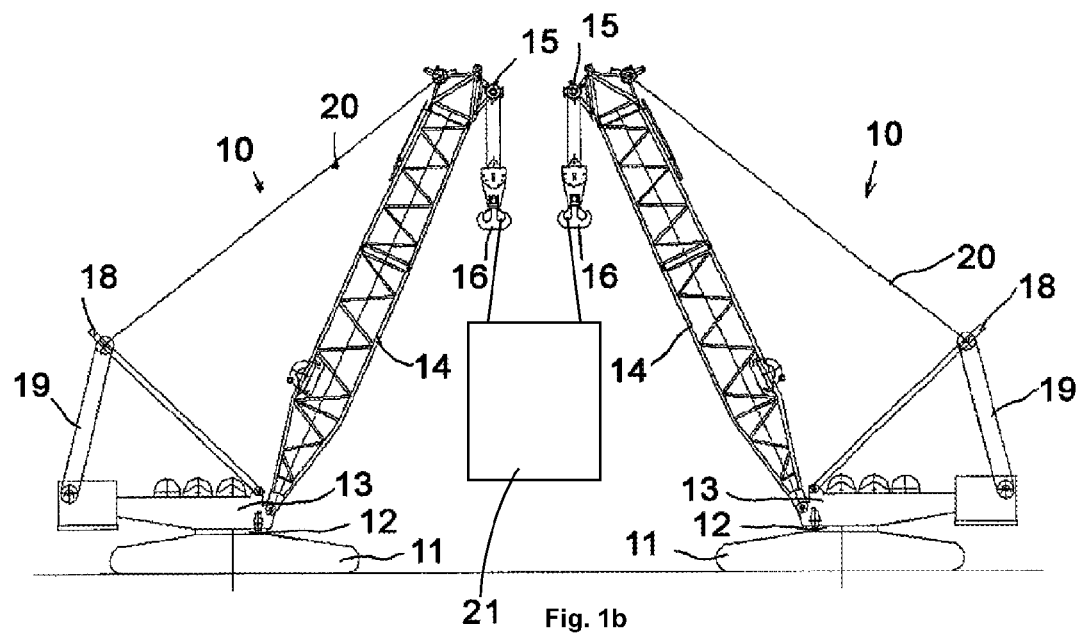

Referring to FIGS. 1a and 1b, it can be seen that currently existing crawler crane 10 comprises a lower propelling body having a crawler 110, an upper slewing body 13 mounted on the lower propelling body by a slewing support mechanism 12 and a boom 14 mounted on the upper slewing body 13. A hoisting pulley block 15 and a lifting hook 16 hung on the hoisting pulley block for hooking an object 21 are provided at a free end 140 of the boom 14. Power from a hydraulic motor drives the crawler 110 and therefore the crane to travel straightly or in a roundabout way, so as to change spatial position of the object. The slewing support mechanism 12 is configured to enable the upper slewing body to make slewing movement about its rotation axis, thereby driving the boom 14 and the object 21 attached thereto to rotate about the slewing center of the crane. A luffing mechanism for changing the pitch angle of the boom 14 comprises a mast 18, a boom host wire rope 19 and a pendant bar 20. One end of the pendant bar 20 is connected to a free end 140 of the boom 14 and the other end of the pendant bar is connected to an end of the boom host wire rope 19. When the boom is required to be hoisted, the hydraulic motor is actuated by a pressure signal so that the hydraulic motor drives a luffing hoist so as to, e.g. wind up or unwind the wire rope to make it subject to certain tensioning or loosening, so that the pendant bar 20 is tensioned or loosened to move the free end of the boom 14 upwards or downwards (i.e. the pitch angle of the boom is changed, so that luffing movement of the boom is achieved). The crawler crane further comprises a hoisting system for accomplishing lifting/lowering movement of the lifting hook 16. The hoisting system comprises a hoisting motor, a hoisting roll, hoisting wire rope and a hoisting pulley block. The lifting hook 16 is connected to the movable pulley block of the hoisting pulley blocks. The hoisting wire rope extends, after roping in prescribed magnification, between the movable pulley block and the stationary pulley block, and finally winds around a hoisting roll. The hoisting motor drives the hoisting roll to wind or unwind, so that the lifting hook is controlled to rise or fall and therefore to meet the requirement of lifting or lowering the object.

The luffing of the boom herein refers to the pitching movement thereof (the horizontal distance from a point of the hook vertically projected onto the horizontal plane where the crane lies to the slewing center line of the crane changes accordingly as the pitch angle changes), and the luffing plane refers to a plane where lies a triangle formed by the boom, the projection of the boom on the horizontal plane and the perpendicular line between the boom top and the horizontal plane.

The term "upper" or "lower" herein refers to the upper or lower direction, with respect to the body of the crane placed at a horizontal position in an operating state, as shown in FIGS. 1a and 1b. The upper and lower directions herein are also called "vertical directions", and the direction perpendicular to the vertical direction is the horizontal direction.

In addition, for easy illustration and description, the "basic crane" herein refers to a single crane that can perform lifting independently. Therefore, for a crawler crane, the basic crane at least comprises a lower propelling body, an upper slewing body and a boom.

Figure 2:
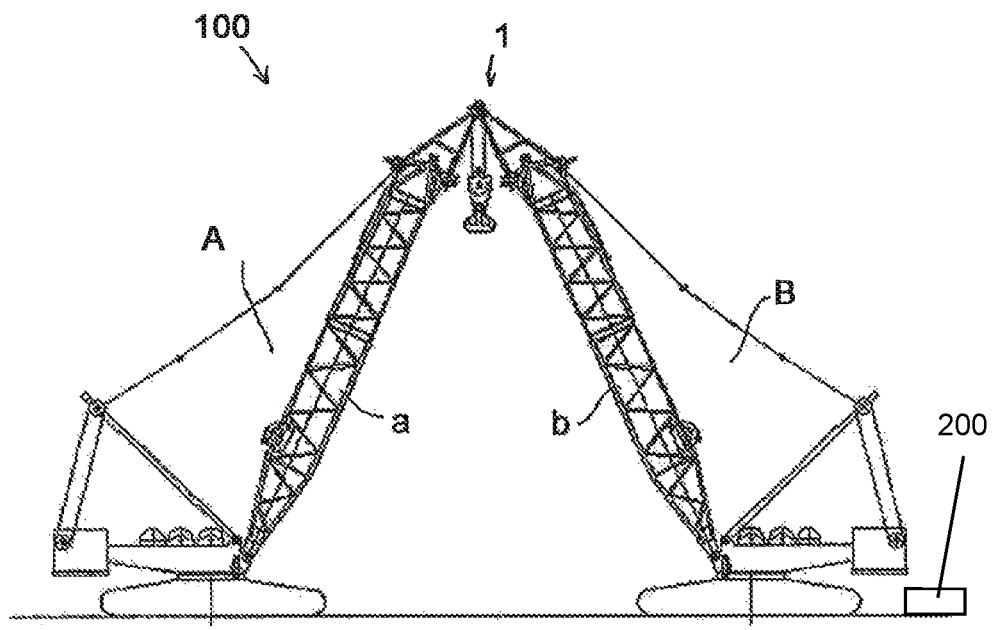
FIG. 2 shows a general schematic view of an embodiment of the combination crane according to the present invention.
Figure 3:
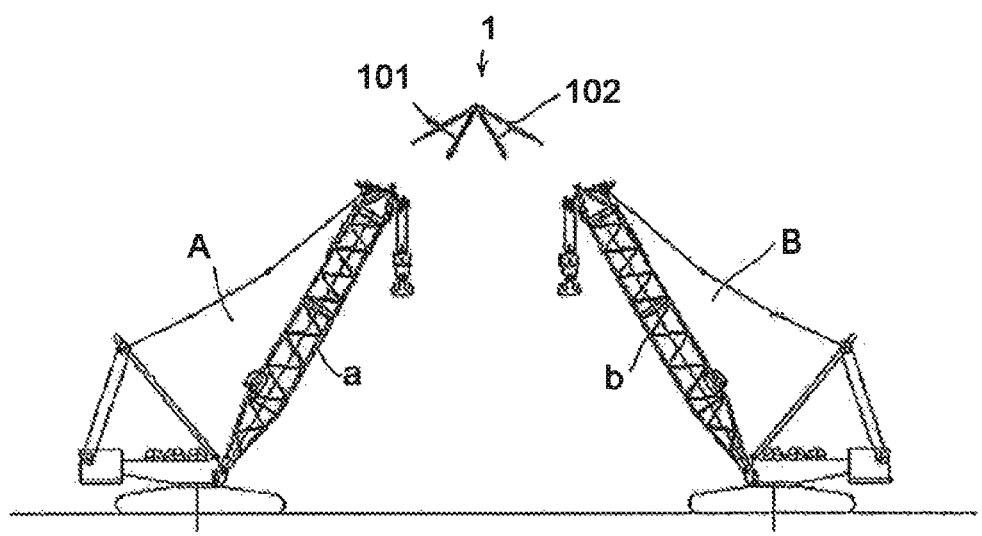
FIG. 3 shows a connector disposed on the top of the combination crane according to the present invention for connecting two basic cranes.

FIGS. 1a and 1b show a possible technical solution in which two cranes lift an object together. In FIG. 1a, lifting is done by means of a balance beam 17 while in FIG. 1*b* the same object is hooked by each of the hooks directly. As mentioned hereinabove, these two technical solutions do not improve the anti-tipping ability or structural stability of the basic cranes. The lifting capacity of this state of the art of a combination of two basic cranes is at the most the sum of the lifting capacity of the two basic cranes. The present invention, in order to improve and extend lifting performance of a combination of two basic cranes, proposes that a connector 1 is used to joint two basic cranes together as a single combination crane 100. Referring to FIG. 2, a crane A and another crane B are arranged such that they face each other and the luffing plane of a boom a of the crane A overlap the luffing plane of a boom b of the crane B. The connector 1 is fixedly connected at the top of the booms a and b and comprises a first connecting arm 101 and a second connecting arm 102. The connection between the connector 1 and the booms a and b is achieved by conventional means, such as welding, riveting, threaded connection, interference connection, flange connection and so on. The connection may be removable or irremovable. The first connecting arm 101 and the second connecting arm 102 are rigidly hinged together to allow them to pivot with respect to each other about a common horizontal pivotal axis at the same vertical pivotal plane. As shown in FIG. 3, the connector 1 can be removed from the booms a and b as a whole.

Further, with reference to FIGS. 4*a*-4*c*, the first connecting arm 101 has a free end 1010 to be fixedly connected to the top end (free end) of the boom a. The connection between the first connecting arm 101 and the boom a paralyzes rotation of the former relative to the latter. The second connecting arm 102 has a free end 1020 to be fixedly connected to the top end (free end) of the boom. The connection between the second connecting arm 102 and the boom b paralyzes rotation of the former relative to the latter. Although the first connecting arm and the second connecting arm are shown to be separate components with respect to the booms a and b, it is obvious for the skilled that the first connecting arm can be at least a part of the boom a, and the second connecting arm can be at least a part of the boom b.

The pivotal axis of the hinged connection between the first connecting arm and the second connecting arm, as shown in FIGS. 4*a*-4*c*, is located at the end area of the first connecting arm 101 and the second connecting arm 102. It is easy for those skilled in the art to conceive that the pivotal axis may be located at other positions of the first and second connecting arms, e.g. approximate to the end area.

The hinged connection between the first and second connecting arms 101 and 102 shown in FIGS. 4*a*-4*c* is achieved by an aperture 104 arranged in the first and second connecting arms and a pin 103 inserted into the aperture. However, it is easy for those skilled in the art to conceive that the hinged connection may be achieved by other means, for instance, a pin shaft arranged on the first connecting arm/the second connecting arm and a claw member arranged on the second connecting arm/the first connecting arm to engage matchingly with the pin shaft.

In an embodiment, the hinged area(s) of the first and/or second connecting arms for forming the hinged connection therebetween include at least one connecting lug 111 on which an aperture 140 through which the pin passes is provided. In a case where the apertures 104 on the connecting lugs 111 of the first and second connecting arms are aligned (as shown in FIG. 4*a*), a horizontal pin passes through the apertures, as shown in FIG. 4*b*, such that a hinged connection is formed between the first and second connecting arms. The pin defines the pivotal axis of the hinged connection so that the first and second connecting arms may pivot about the horizontal pivotal axis in a common vertical plane. In order to limit movement of the first and second connecting arms 101, 102 in other directions, such as the longitudinal axial direction of the pin, a stopping device or a locking device may be arranged such that only one pivotal movement freedom about the pivotal axis exists between the first and second connecting arms.

Because the booms of most cranes are girder structured, the first and second connecting arms may be accordingly designed in girder structure. Of course, in the case of meeting strength requirement of the design, those skilled in the art may design the first and second connecting arms as having other structures such as box-like structure or block structure.

According to strength requirement of the design, one or more connecting lugs may be provided on the first or second connecting arms. As shown in FIG. 4*a*, there are two connecting lugs arranged on front and rear edge beams of each of the first and second connecting arms (the term "front" and "rear" here refer to directions seen from the extending direction of the horizontal pivotal axis shown in FIG. 4*b*, which is perpendicular to the paper surface). The connecting lugs may be configured in different forms, such as in single-sheet form, in a fork form (a fork-like connecting lug having at least two branch lugs extending parallel). Referring to FIG. 4*c*, a connecting lug 111 on one of the connecting arms is designed as a single-sheet form while the matching connecting lug is designed as a fork form (for example, double branch form having two branch lugs). A corresponding single-sheet connecting lug is inserted into the gap between two branch lugs 111*a*, 111*b* of the fork-like connecting lug, and this pair of connecting lugs is connected in series by a pin through the holes or apertures in the connecting lugs. Those skilled in the art, of course, could envisage that the matching configuration between the connecting lugs may be a single-sheet form/a single-sheet form, double-branch form/three-branch form, three-branch form/four-branch form, and so on.

In the embodiment shown in FIG. 4*c*, the connecting lug 111 differs from its matching connecting lug 111 in configuration. Preferably, the configurations of the connecting lugs on the same connecting arm may differ from each other.

Referring to FIGS. 5*a* and 5*b*, it can be seen that the connecting lugs on the ends of the front and rear edge beams of the first connecting arm 101 differ from each other, namely, one being in the single-sheet form, and the other being in the fork-like form. From the view of the connection strength, it is preferable that the matching connecting lugs on the second connecting arm 102 be in the fork-like form and in the single-sheet form respectively. Of course, it is easily conceivable for the skilled in the art that the connecting lug on the first connecting arm and the matching connecting lug on the second connecting arm can both be in the fork-like form or in the single-sheet form.

Furthermore, referring to FIG. 6*a*, according to an embodiment of the invention, for the sake of fast, simple and accurate connection between the booms a and b, the connector 1 may further comprise a guide mechanism 106 for guiding movement of the first and second connecting arms 101, 102 to position them at a predetermined position. Specifically, the guide mechanism 106 guides the first and second connecting arms 101 and 102 to move toward each other to allow locating them generally within the same vertical plane and aligning the apertures in the connecting lugs of the first and second connecting arms. In the embodiment shown in FIG. 6*a*, the guide mechanism 106 includes a first guide part 1061 connected to the first connecting arm and a second guide part 1060 connected to the second connecting arm. A recess 1061*a* and a protrusion 1061*b* are provided on the first guide part 1061. The second guide part 1062 is provided with a recess 1062*b* for cooperating with the protrusion 1061*b* arranged on the first guide part, and a protrusion 1062*a* for cooperating with the recess 1061*a* of the first guide part. Once the protrusion 1061*b* on the first guide part contacts the bottom of recess 1062*b* of the second guide part and the protrusion 1062*a* of the second guide part contacts the bottom of the recess 1061*a* of the first guide part, the guide mechanism will send to the control system of the crane a signal indicating that the first and second connecting arms are positioned in alignment.

In an embodiment shown in FIG. 6*b*, the apertures in the connecting lugs of one of the connecting arms have non-closed circumferences (when viewed in cross section), but are arc shaped as shown in FIG. 6*b*. During assembling the connector 1, these apertures having non-closed circumference merely clamp onto the pin inserted into the apertures of the connecting lugs of the other connecting arm. In order to fix the pin, as shown in the drawings, a lock hook 107 may be arranged on the second connecting arm 102. The lock hook is configured to move between a lock position where the lock hook is engaged with the pin and an unlock position where the lock hook is disengaged with the pin. The lock hook 107 hooks the pin at its lock position and acts in conjunction with the apertures having non-closed circumference to prevent the connecting arm from disengaging with the pin. In this embodiment, for facilitating forming the hinged connection, a guide mechanism may also be applied to guide the movement of the first and second connecting arms so as to position the first and second connecting arms in a position ready for the above clamping connection.

In an embodiment shown in FIGS. 6*b* and 6*c*, the connector further comprises a lock/unlock mechanism 108 configured to secure or disconnect the hinged connection between the first and second connecting arms. The lock/unlock mechanism 108 may include at least one executing element, e.g. hydraulic cylinder or electrical pushing rod, capable of receiving the control signal from the control system and extending or retracting in response to the signal received.

In order to automate the connecting operation, the crane system may include a control system 200 assisting in completing the assembling of the connector and connection between the booms. For example, the control system 200 may be configured to send, upon receipt of the aligning signal, an instruction to the robotic arm commanding the robotic arm insert a pin into the aligned apertures and operate the lock/unlock mechanism to secure the hinged connection, in order to ensure that the first and second connecting arms are only capable of making pivotal movement within the same plane during lifting operation of the combination crane.

Figure 7:
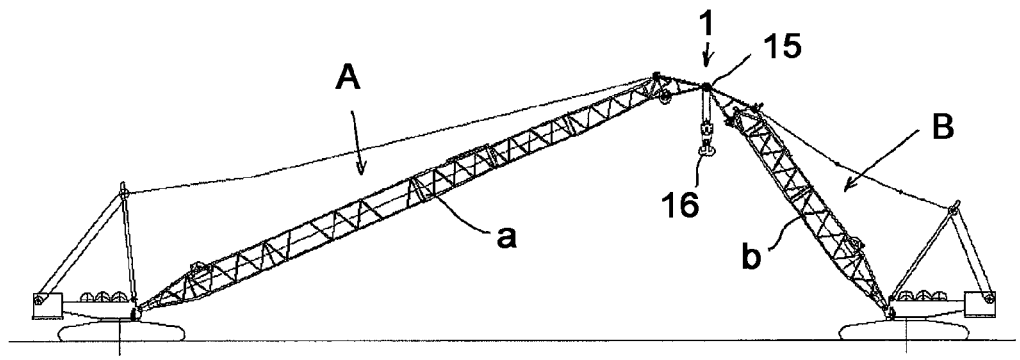
FIG. 7 shows two cranes, having booms of different lengths, lift an object jointly after being connected by the connector of the present invention.

The connector shown in FIGS. 2 and 3 unites two basic cranes having booms of substantially the same length to perform lifting operation. In this case, the two booms are subject to equal loads from the object which is to be lifted in the space between the two cranes facing to each other. The present invention may also be applied to unite two basic cranes having booms of different lengths, as shown in FIG. 7. In the circumstance shown in FIG. 7, the axial forces distributed to the two booms from the object to be lifted are not equal and the moving speed of the object to be lifted is more approximate to the moving speed of the crane which is less distant away from the object to be lifted. Furthermore, in a case where two basic cranes are united to perform lifting operation, in case of one set of hoisting pulley block, the hoisting pulley block 15 may be arranged in association with the horizontal pivotal axis of the connector (as shown in FIG. 7) or arranged on the top of one of the two booms, such that the hoisting pulley block is positioned inside the angle defined by the two booms of the two basic cranes. Of course, two sets of hoisting pulley block may be used (as shown in FIG. 2 or 3, wherein no additional hoisting system is needed), each set of hoisting pulley block being disposed on the top of the boom of the respective basic crane such that the two sets of hoisting pulley blocks are located inside the angle defined by the booms of the two basic cranes. The mounting position or the number of the lifting pulley block(s) can be determined according to the lifting performance of each basic crane and the specific weight to be lifted by those skilled in the art.

Figure 7A:
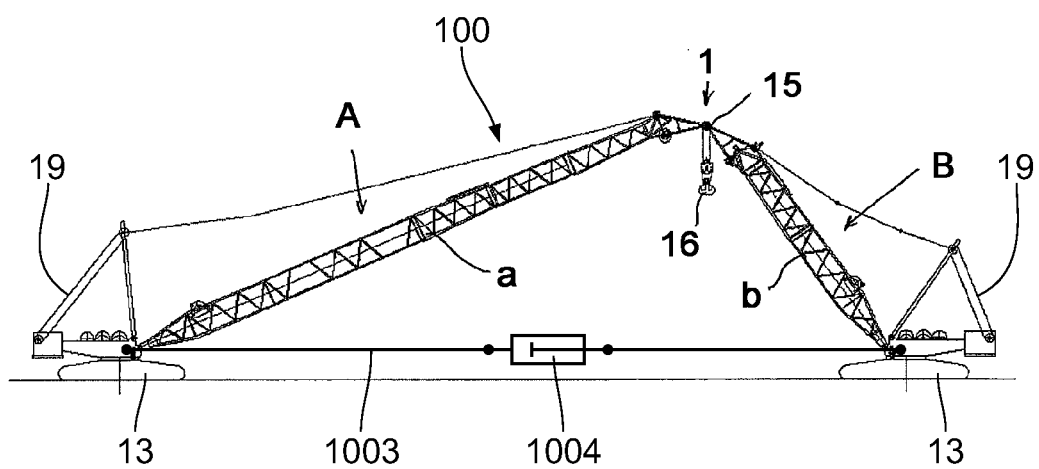
FIG. 7a shows the two cranes of FIG. 7 being tied with a tying element.
Figure 8:
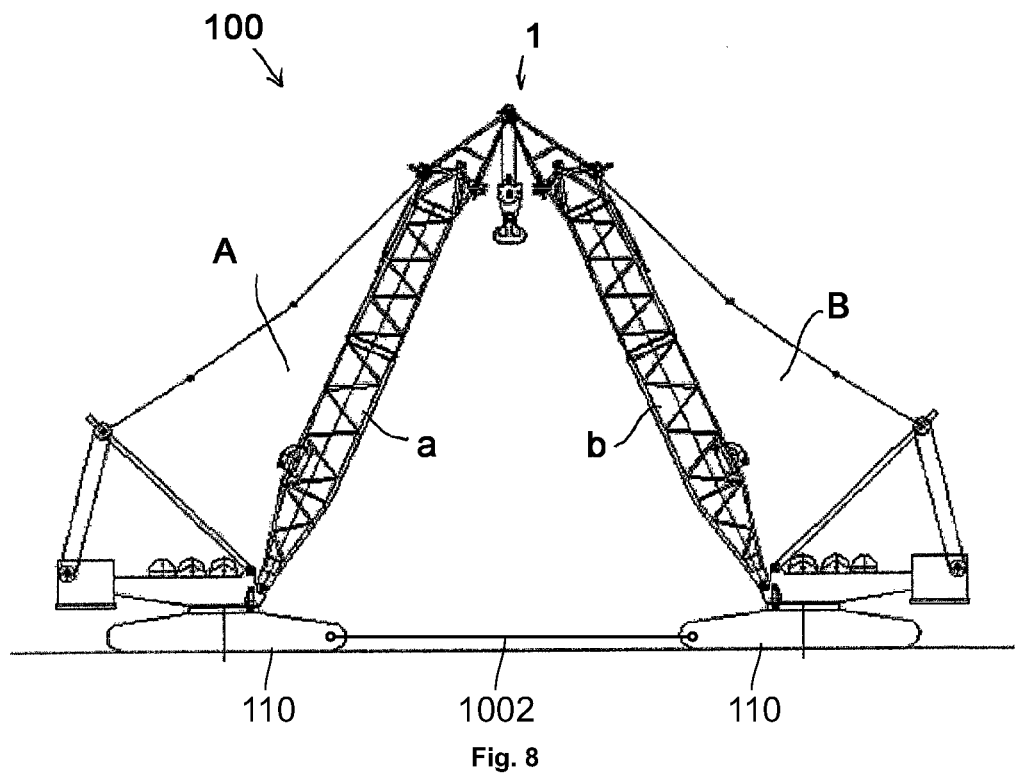
FIG. 8 shows a crane of a further embodiment of the invention.
Figure 9:
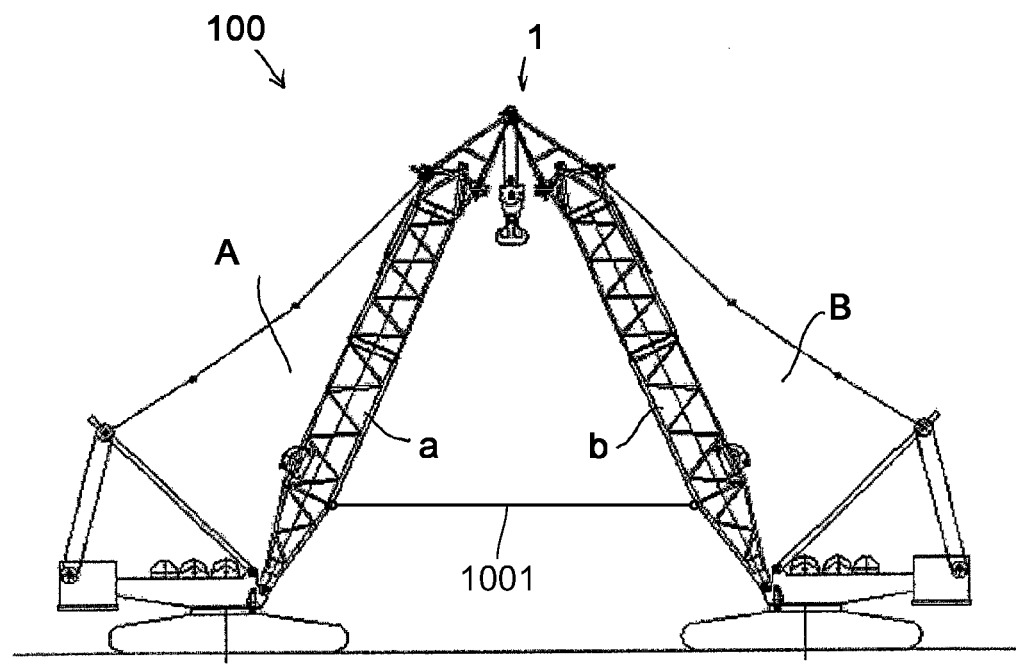
FIG. 9 shows the two cranes of FIG. 2 being tied by a tying element.

The combination crane 100 as shown in FIG. 7*a* comprises a tying element 1003. The tying element 1003 directly ties the first crane A with the second crane B. The tying element 1003 is directly attached to the upper slewing body 13 of the first crane A and to the upper slewing body of the second crane B. The tying element 1003 is releasably attached to each of the cranes A, B. Further, variable length and/or variable force adjusting element 1004 is provided. The variable length and/or variable force adjusting element 1004 enables compensation of unsymmetrical distribution of the reaction forces in the cranes A, B, in particular in the booms a, b of the cranes A, B. According to the preferred embodiment in FIG. 7*a*, the variable length and/or variable force adjusting element 1004 is a hydraulic cylinder. However, it is also possible to use a pneumatic cylinder as the variable length and/or variable force adjusting element 1004. Furthermore, the element 1004 may comprise of a rope winch or a combination of rope winch and pulleys In particular, it is possible to compensate unsymmetrical loads caused by leakage along the hydraulic lines. Further, unsymmetrical loads can be caused by hoisting winches, which are used for tying the booms a, b with the boom host wire rope 19. Unsymmetrical loading of the combination crane 100 as shown in FIG. 7 is mainly caused by the different lengths of the booms a, b of the cranes A, B. However, also unsymmetrical hoisting of the booms a, b with the boom host wire rope 19 and/or leakage may cause an unsymmetrical loading state. Thus, the variable length and/or variable force adjusting element can also be integrated in a crane as shown in FIG. 8 or 9.

In order to learn the advantages of the connector and the combination crane of the invention more clearly, the crawler crane shown in the drawings is taken as an example to illustrate the assembling method of the connector according to the present invention and the operating process of the combination crane.

The assembling methods of the connector of the present invention can be classified, in terms of spatial position, as follows: 1) assembling on the ground; 2) assembling in the air. The assembling methods of the connector can also be carried out manually or automatically. Hence, the connector of the present invention may be automatically assembled in the air, manually assembled on the ground and so on. The following is an exemplary description of two of the assembling methods.

Manual connection on the ground: the booms of the cranes A and B are substantially positioned horizontally and arranged facing each other within the same luffing plane; the free end 1010 of the first connecting arm 101 of the connector 1 is fixedly connected to the free end of the boom of the crane A, and the free end 1020 of the second connecting arm 102 of the connector is fixedly connected to the free end of the boom of the crane B to position the first and second connecting arms relative to each other such that their respective apertures 104 are aligned. The pin 103 is inserted into the aligned apertures and is fixed by means of a stopping device or locking mechanism; the booms of the cranes A and B are lifted by means of a luffing mechanism and the crawlers of the cranes A and B are instructed to travel in their directions as required.

Automatic connection in the air: the booms of the cranes A and B have a respective pitch angle and the cranes are controlled by the control system to walk or slew so that the booms of the cranes A and B are positioned facing each other within the same luffing plane; the control signal from the control system instructs the robotic arms to rigidly connect the free ends of the first and second connecting arms to the free ends of the booms of the cranes A and B respectively; the first connecting arm 101 and the second connecting arm 102 are positioned through the guiding of the guide mechanism; after positioning, the robotic arm, under control command from the control system, inserts the pin into the apertures in the hinged region of the first and second connecting arms to form a hinged connection; the control system then sends a control command to the lock/unlock mechanism 108 to lock the hinged connection and to prevent disconnection thereof. Because all the above actions are done by the robotic arms under the control of the control system, the connection can be done in a fast and precise manner, which therefore can avoid risks of safety accidents happening to operators working high above the ground for assembling and connecting the two basic cranes.

It is to be noted that usually when the booms are erected in the air, the free end of the booms is generally at a position 5 meters, or 15 meters or higher above the ground, so both the risk and cost involved in operators' working high above the ground is extremely considerable. Therefore, automatic means for completing the connection is significantly advantageous. The operator in the cab only needs to send individual signals for connection: moving the cranes, lowering the booms, turning left a little bit, turning right a little bit, inserting the pin into the apertures or clamping the connecting arms on the pin, sending a signal to actuate the lock/unlock mechanism and so on. Thus, the automatic means is simple to execute and operation error has a rather low chance to occur.

As a matter of fact, the technical solution of assembling the connector on the ground can also be accomplished with the aid of automatic control of the control system, because all the above connection actions can be standardized and automatized by programming.

As to the well-assembled combination crane 100, firstly, the brakes of respective slewing support mechanisms are instructed by the control system to be in an open state. That is to say, the brakes are switched to release the braking imposed on the slewing movement of the slewing support mechanism and then each of the basic cranes can freely make slewing movement. During lifting operation, the traveling crawler of each of the basic cranes may travel in any direction as required.

The hinged connection achieved by this connector enables the booms of the two basic cranes to almost form a triangle (the plane where the triangle lies is the common luffing plane of the booms). The angle formed by the two booms will change according to the change in the horizontal distance between the two basic cranes, and during the change of the angle, the movements of the two booms are associated with each other always due to the hinged connection. When the combination crane is working with the weight being positioned inside the angle defined by the two booms, the anti-tipping capacity and structural stability of such a combination crane is enhanced substantially.

During lifting operation of the combination crane 100, because the connector serves as an intermediate element for transferring force and the horizontal opposite forces on the two booms may be neutralized, force in the pendant bar is not always necessary for supporting the boom. In other words, the pendant bar can be in a completely loose state when the cranes are traveling or the booms are varying their pitch angles. Because the pendant bar is not tensioned always, the axial force applied to the booms is reduced greatly, about by half sometimes. Additionally, some components, such as the pendant bar, hoisting wire rope and the mast will not be considered as limiting factors any more due to the decrease in the force they are bearing, which means that no more money for buying expensive components, for example, wire rope or pulley or bearings with bigger diameters, is needed to meet the requirement for the lifting.

During lifting operation of the combination crane 100, the control system must conduct a real-time monitoring on the force borne by the pendant bar. When the force in the pendant bar is very small, the hoisting wire rope shall be controlled by the control system to prevent secondary failures such as rope tangling. In addition, when the booms become horizontal, the tensioning force in the pendant bars of the two basic cranes are increased by the control system, so as to raise the booms up and therefore prevent the cranes from sliding on the ground.

The above depiction is directed to only preferred embodiments of the present invention and shall not be taken as limiting or restricting this invention since various modifications and variations may be made without departing from the scope of the present invention through the exercise of those skilled in the art. Other embodiments may be obtained on the basis of disclosure in the description. The description and embodiments shall be considered exemplary only and the true scope of the invention is defined by the annexed claims and equivalents thereof. Further, with reference to FIG. 8, a further embodiment of the combination crane 100 is described. The combination crane 100 according to FIG. 8 is similar to the combination crane 100 of FIG. 2. The main difference is the use of a tying element 1002. The tying element 1002 itself can be identical to the tying element 1001 in FIG. 9 or the tying element 1003 in FIG. 7a. As shown in FIG. 8, the tying element 1002 is directly fixed at the crawlers 110 of the first crane A and to the crawlers 110 of the second crane B. The overall stability of the combination crane 100 in FIG. 8 is additionally enhanced. However, it is also possible to attach the tying element 1001 to at least one of the lower propelling bodies 11 of one of the cranes A, B, in particular to the crawlers 110 of the cranes A, B.

Further, with reference to FIG. 9, a further embodiment of the combination crane 100 is described. The combination crane 100 according to FIG. 9 is similar to the combination crane of FIG. 8. The main difference is the position of the tying element 1001. In order to enhance the stability of the combination crane 100 a tying element 1001 is provided. The tying element 1001 directly ties the first crane A with the second crane B. The tying element 1001 according to the preferred embodiment in FIG. 2 is a rope. However, alternative embodiments are possible, e. g. a tie rod or a chain. It is also possible to provide more than one tying element 1001 for further enhancement for the stability of the crane.

As shown in FIG. 2 the tying element 1001 is releasably attached to the boom a of the first crane A and to the boom b of the second crane B. Due to the releasable attachment of the tying element 1001 to the booms a, b, it is possible to transport the tying element 1001 separately from the cranes A, B. The tying element 1001 is preferably horizontally oriented. However, an inclined orientation of the tying element 1001 is possible. A maximum inclination angle is at most 10°, in particular at most 5°, in particular at most 1°. The tying element 1001 enables closure of a force-triangle. Said force-triangle is provided by a load which is to be lifted by the combination crane and which is introduced into each of the booms a, b of the cranes A, B. Once the loads in the booms a, b of the force-triangle 3 exceed the frictional forces between the crawlers 110 and the underground the cranes A, B would shift away from each other. Such shifting of the cranes A, B is prevented by the tying element 1001. The tying element 1001 increases the stability of the single combination crane 100, at least for high loads to be lifted.

What is claimed is:

1. A connector (1) for connecting a first crane (A) and a second crane (B), each crane having a boom (14), said connector comprising a first connecting arm (101) and a second connecting arm (102), the first connecting arm (101) building the top of the boom (14) of the first crane (A), the second connecting arm (102) building the top of the boom of the second crane (B), the first connecting arm (101) and the second connecting arm (102) being hinged together about only one common pivotal axis within a common pivotal plane, and wherein the booms (14) the first and the second cranes are linked up in motion in a common luffing plane, wherein the luffing plane is identical to the pivotal plane, wherein the connector (1) comprises a guide mechanism (106) configured to guide the first and second connecting arms (101, 102) to move to position the first and second connecting arms (101, 102) at a predetermined position during assembling the connector (1).

2. A connector (1) according to claim 1, wherein the horizontal pivotal axis is positioned within end region(s) of at least one of the first connecting arm (101) and the second connecting arm (102).

3. A connector (1) according to claim 1, wherein the hinged connection between the first and second connecting arms (101, 102) are achieved by apertures in the first and second connecting arms (101, 102) and a pin (103) inserted into the apertures.

4. A connector (1) for connecting a first crane (A) and a second crane (B), each crane having a boom (14), said connector comprising a first connecting arm (101) and a second connecting arm (102), the first connecting arm (101) building the top of the boom (14) of the first crane (A), the second connecting arm (102) building the top of the boom of the second crane (B), the first connecting arm (101) and the second connecting arm (102) being hinged together about only one common pivotal axis within a common pivotal plane, and wherein the booms (14) the first and the second cranes are linked up in motion in a common luffing plane, wherein the luffing plane is identical to the pivotal plane, wherein the connector (1) includes a lock/unlock mechanism which is configured to one of secure and disconnect the hinged connection between the first and second connecting arms (101, 102).

5. A combination crane (100), comprising a connector (1) for connecting a first crane (A) and a second crane (B), each crane having a boom (14), said connector comprising a first connecting arm (101) and a second connecting arm (102), the first connecting arm (101) building the top of the boom (14) of the first crane (A), the second connecting arm (102) building the top of the boom of the second crane (B), the first connecting arm (101) and the second connecting arm (102) being hinged together about only one common pivotal axis within a common pivotal plane, and wherein the booms (14) the first and the second cranes are linked up in motion in a common luffing plane, wherein the luffing plane is identical to the pivotal plane, and two basic cranes having booms (14) and connected by the connector (1), wherein the combination crane (100) comprises a control system for monitoring the force in the pendant bars of the basic cranes.

6. A combination crane (100) according to claim 5, wherein the booms (14) of the basic cranes have one of equal and unequal lengths.

7. A combination crane according to claim 5, wherein the combination crane (100) comprises a hoisting pulley block (15) linked one of to the horizontal pivotal axis of the connector (1) and on the top end of the boom of one of the two basic cranes, the hoisting pulley block (15) being located inside the angle defined by the booms (14) of the two basic cranes.

8. A combination crane (100) according to claim 5, wherein the combination crane (100) comprises a pair of hoisting pulley blocks (15), each of which is arranged on the top end of the boom (14) of corresponding basic crane respectively, the pair of hoisting pulley cranes being located inside the angle defined by the booms (14) of the two basic arms.

9. A combination crane (100) according to claim 5, wherein the basic crane has a slewing support mechanism (12) for enabling the boom to make slewing movements about the slewing centre of the basic crane.

10. A method for connecting the two basic cranes having booms (14) with a connector (1) for connecting a first crane (A) and a second crane (B), each crane having a boom (14), said connector comprising a first connecting arm (101) and a second connecting arm (102), the first connecting arm (101) building the top of the boom (14) of the first crane (A), the second connecting arm (102) building the top of the boom of the second crane (B), the first connecting arm (101) and the second connecting arm (102) being hinged together about only one common pivotal axis within a common pivotal plane, and wherein the booms (14) the first and the second cranes are linked up in motion in a common luffing plane, wherein the luffing plane is identical to the pivotal plane, comprising steps of:
   a) maneuvering the booms (14) of the two basic cranes such that they face each other within the same luffing plane;
   b) positioning the first and second connecting arms (101, 102) relative to each other at predetermined positions, said positioning includes monitoring the guide mechanism provided on the connector (1) by a control system to achieve relative positioning of the first and second connecting arms (101, 102);
   c) hinging the first and second connecting arms (101, 102) together, orienting a pivotal axis of the hinged connection horizontally.

11. A method according to claim 10, wherein that the step b) comprises prior to the positioning, fixedly connecting a free end of the first connecting arm (101) of the connector (1) to a top end of a boom of one of the two basic cranes and fixedly connecting a free end of the second connecting arm (102) of the connector (1) to a top end of a boom of the other of the two basic cranes.

12. A method according to claim 10, wherein the method comprises, upon forming the hinged connection, controlling a lock/unlock mechanism (108) provided on the connector (1) by means of a control system to one of secure and disconnect the hinged connection.

* * * * *